US007814629B2

(12) United States Patent
Uzun

(10) Patent No.: US 7,814,629 B2

(45) Date of Patent: Oct. 19, 2010

(54) STRUT SPRING COMPRESSION APPARATUS

(76) Inventor: Ismet Uzun, 2405 Bainbridge Blvd., West Chicago, IL (US) 60185

(*) Notice: Subject to any disclaimer, the term of this patent is extended or adjusted under 35 U.S.C. 154(b) by 167 days.

(21) Appl. No.: 11/827,308

(22) Filed: Jul. 11, 2007

(65) Prior Publication Data

US 2009/0013514 A1 Jan. 15, 2009

(51) Int. Cl.
*B23P 19/04* (2006.01)
*B60P 1/48* (2006.01)
*B66F 3/00* (2006.01)

(52) U.S. Cl. ........................ 29/227; 254/10.5; 254/134; 269/902

(58) Field of Classification Search ................... 29/227, 29/225, 226, 228, 238, 239, 240.5, 216–218; 254/2 B, 3 B, 8 B, 9 B, 10.5, 14, 100, DIG. 4; 269/164, 256, 902; *B25B 27/30; B23P 19/04; B60G 25/00*

See application file for complete search history.

(56) References Cited

U.S. PATENT DOCUMENTS 3,178,808 A * 4/1965 Pendley ....................... 29/227
3,814,382 A 6/1974 Castoe
4,034,960 A 7/1977 Kloster
4,036,473 A 7/1977 Kloster
4,295,634 A 10/1981 Spainhour et al.
4,395,020 A 7/1983 Spainhour
4,486,935 A 12/1984 Kashiwagi
4,494,289 A 1/1985 Matsuura
4,520,543 A 6/1985 Ito
4,703,547 A 11/1987 Togawa
5,031,294 A * 7/1991 Krueger ....................... 29/227
5,172,462 A * 12/1992 Ha .............................. 29/227
5,680,686 A 10/1997 Bosche et al.
5,954,314 A * 9/1999 Weisshaar .................. 254/10.5
6,129,339 A 10/2000 Lundgreen et al.
6,336,625 B1 1/2002 Liso
6,719,305 B1 4/2004 Lundgreen et al.
7,103,951 B2 9/2006 Uzun
2006/0016059 A1 * 1/2006 Park ........................ 29/402.01

* cited by examiner

*Primary Examiner*—Joseph J Hail, III
*Assistant Examiner*—Jamal Daniel
(74) *Attorney, Agent, or Firm*—Meroni & Meroni, P.C.; Charles F. Meroni, Jr.; Christopher J. Scott

(57) ABSTRACT

A spring-compression apparatus for facilitating maintenance of a strut assembly comprises a guide member, a carriage assembly, and a spring-channeling assembly. The guide member comprises a first member end and a second member end. The carriage assembly comprises a jack assembly and a slide assembly. The jack assembly is operable to otherwise displace the slide assembly along the guide member. The slide assembly comprises a locator assembly, which comprises a locator extension arm and a pivotable strut end interface. A strut spring is receivable in the spring channeling assembly as laterally engaged therewith. The strut end interface is engageable with a strut end for compressing the strut spring. The locator assembly further enables a user to remove a mounting nut from the interface-engaged end when the strut spring is compressed, thus enabling strut assembly disassembly.

18 Claims, 5 Drawing Sheets

STRUT SPRING COMPRESSION APPARATUS

BACKGROUND OF THE INVENTION

1. Field of the Invention

The present invention generally relates to an apparatus for facilitating maintenance of a McPherson type strut assembly. More particularly, the present invention relates to a spring-compression apparatus for enabling users thereof to quickly and safely disassemble and reassemble a McPherson type strut assembly.

2. Description of the Prior Art

In order to properly maintain a strut assembly comprising a high tension strut spring, it is necessary to first compress the strut spring so as to remove or otherwise redirect forces away from structure maintaining the strut spring in a spring-compressed state. Once the strut spring is further compressed and forces are redirected, a mounting nut may be removed from the strut assembly and the strut spring may be decompressed to a relaxed state. The strut assembly may then be maintained or repaired as required. A number of apparatuses have been developed with an eye toward facilitating strut spring compression. Some of the more pertinent prior art relating to strut spring compression devices and the like is described hereinafter.

U.S. Pat. No. 3,814,382 ('382 Patent), which issued to Castoe, discloses a Spring Compressor. The '382 Patent teaches an apparatus for compressing a spring in conjunction with a shock absorber or other similar structure wherein the apparatus includes a frame upon which a spring to be compressed is mounted. An upper yoke member is slidably mounted in the frame and is operatively connected to a power source whereby a bracket is in position to act with a source yoke member to contact a spring being compressed. Downward movement of the yoke causes compression of the spring in a manner that any desired service or operation can be performed on the spring assembly being compressed. The frame further includes a safety mechanism to insure that the spring is safely compressed during service.

U.S. Pat. No. 4,295,634 ('634 Patent) and U.S. Pat. No. 4,395,020 ('020 Patent), which issued to Spainhour, both disclose a Strut Compressor. The '634 and '020 Patents teach a spring compressor employing a fluid operated piston cylinder, which drives a first platen toward a second platen to compress a McPherson type strut mounted between the two platens. The '020 Patent further teaches that the first platen may be pivotally mounted for self-adjustment to accommodate many different strut sizes and designs.

U.S. Pat. No. 4,703,547 ('547 Patent), which issued to Togawa, discloses an Apparatus for Assembling a Vehicle Suspension Mechanism. The '547 Patent teaches an apparatus for assembling a coil spring on a damper strut to manufacture a damper strut assembly. The apparatus includes a clamp for holding the strut in a vertical direction with the lower end of the spring attached to a lower spring seat provided on the strut. A caliper type spring depresser is provided. The depresser is mounted on a plate for movement along a substantially vertical guide rail mechanism. The plate is swingable in a substantially vertical plane so that the direction of movement of the depresser can be adjusted so as to coincide with the direction of the axis of the spring.

U.S. Pat. No. 5,031,294 ('294 Patent), which issued to Krueger, discloses a Strut Spring Compressor. The '294 Patent teaches an apparatus for use in assembly and disassembly of a strut assembly having a shock absorber disposed within a coil spring. The apparatus includes a frame and a first spring engagement member secured to the frame for engaging the first end of the spring of a strut. A second spring engagement member is provided connected to the frame for movement with the frame toward and away from the first spring engagement member.

U.S. Pat. No. 5,680,686 ('686 Patent), which issued to Bosche et al., discloses a Strut Spring Compressor having Floating Compression Head. The '686 Patent teaches an apparatus for use in assembling and disassembling a strut assembly of the type having a shock absorber axially disposed within a coil spring including a frame, a first section connected to the frame for supporting the lower portion of the spring, and a second section for holding the upper portion of the spring or upper spring seat. The second section is movable toward and away from the first section and is arranged for axially compressing the spring as the second section moves toward the first section. The second section includes guide structure, a head, linkage structure, and pivot structure. The guide structure is connected to the frame and is for allowing the second section to move toward and away from the first section. The head is mounted on the guide structure and is for positioning the spring. The linkage structure is connected to the guide structure and is for allowing the head to tilt in a first plane generally parallel to the linear axis of the spring. The pivot structure connects the head to the guide structure and is for allowing the head to tilt in a second plane intersecting the first plane.

U.S. Pat No. 7,103,951 ('951 Patent), which previously issued to the author of the present disclosure, teaches a spring-compression apparatus for facilitating maintenance of a strut assembly comprising a guide member, a carriage assembly, and a rest assembly. The guide member comprises a first member end and a second member end. The carriage assembly comprises a jack assembly and a slide assembly. The jack assembly is operable to otherwise displace the slide assembly along the guide member. The slide assembly comprises a locator assembly, which comprises a locator extension arm and a center locator. The rest assembly comprises a center rest. A first strut end is positionable upon the center rest. The center locator is engageable with a second strut end for compressing the strut spring. The locator assembly further enables a user to remove a mounting nut from the second strut end when the strut spring is compressed, thus enabling strut assembly disassembly.

It may be seen from an inspection of the foregoing, as well as from a consideration of the general state of the art, that the prior art appears to be silent on a strut spring compression apparatus comprising laterally-displaceable, cooperative, pivotable helix-channeling structures for channel-receiving or channel-anchoring a helix type coil or spring of a strut assembly. Further, the prior art appears to be silent on a strut spring compression apparatus comprising a pivotable crown structure for seating upon variously constructed strut assemblies having spring seats, as variously angled relative to the axis of the respective strut assembly. The prior art thus perceives a need for such an apparatus, as summarized in more detail hereinafter.

SUMMARY OF THE INVENTION

It is thus a primary object of the present invention to provide a spring-compression apparatus that enables users thereof to quickly and efficiently disassemble and reassemble McPherson type strut assemblies. It is a further object of the present invention to provide a spring-compression apparatus that enables users thereof to disassemble and reassemble McPherson type strut assemblies of various designs.

To achieve these and other readily apparent objectives, the present invention essentially provides a spring-compression apparatus for facilitating maintenance of a McPherson type strut assembly. In this regard, the typical McPherson type strut assembly essentially comprises a first strut end, a strut body, a strut spring, a piston rod, a spring seat, a mounting nut, a second strut end, and a longitudinal strut axis. The piston rod comprises a threaded rod end and the strut axis extends through the strut body and the piston rod. The spring seat comprises a rod-receiving aperture and the mounting nut is threadably received on the rod end adjacent the rod-receiving aperture for maintaining the strut assembly in an assembled, spring-compressed state.

The spring-compression apparatus comprises a guide member, a carriage assembly, and a spring-engagement assembly. The guide member or main upright comprises a first member end, a second member end, and a member length extending intermediate the first member end and the second member end. The carriage assembly comprises a jack assembly and a slide assembly. The jack assembly comprises a jack, certain jack extension means, and certain jack release means. The slide assembly comprises a locator extension arm and a carriage. The carriage comprises a member-receiving tunnel, which tunnel slidably receives the guide member such that the carriage is guided along the axis of the upright guide member. The locator assembly comprises a locator extension arm, a strut end interfacing center locator, and certain nut accessing means.

The spring-engagement assembly preferably comprises a screw mechanism, first and second laterally disposed screw-mounted extension arms, and first and second helix-engaging or coil-engaging channel structures attached to first ends of the extension arms. Second ends of the extension arms are screw-mounted to the screw mechanism, and the screw mechanism is cooperably associated with the guide member such that the screw axis as fixed relative to the axis of the guide member. The screw mechanism thus functions to laterally displace the first and second helix-engaging channels into and out of engagement with the strut spring. The helix-engaging channels each comprise certain channel-like structure such that when laterally opposed arc lengths of the helix or coil of strut spring are received, the axis of the coil centrally located to the channel junctions is relatively fixed in space.

The helix-engaging channel structures are pivotally attached to vertical extensions of the extension arms, which pivotable attachment enables a user to engage a variably pitched strut spring. Stated another way, the pivotally attached helix-engaging channel structures function to enable a user to engage strut springs having varied chirality or coil handedness. One or more of the vertical extensions may comprise means for enabling a user to vertically displace the pivotally attached helix-engaging channel structure to engage variably torsioned strut springs.

The strut spring or coil of the strut assembly is thus graspable by the channel structures for fixing a first end or portion of the strut axis. The jack extension means are thus operable to extend the jack and displace the strut end interfacing device or center locator toward the channel structures. The center locator is thus engageable with the strut end or spring seat for fixing a second end or portion of the strut axis and serving as an interface when compressing or "apparatus-compressing" the strut spring. The nut accessing means enable a user to remove the mounting nut from the rod end after the strut spring is sufficiently apparatus-compressed.

Other objects of the present invention, as well as particular features, elements, and advantages thereof, will be elucidated in, or apparent from, the following description and the accompanying drawing figures.

BRIEF DESCRIPTION OF THE DRAWINGS

Other features of my invention will become more evident from a consideration of the following brief description of patent drawings:

FIG. 6(*a*) is an enlarged fragmentary sectional view of the pivotable strut interfacing crown assembly of the apparatus as enlarged from FIG. 6 depicting the crown assembly seated upon a spring seat angled relative to the axis of the strut assembly.

FIG. 7(*a*) is an enlarged fragmentary sectional view of the right portion of the spring-engagement assembly as enlarged from FIG. 7 depicting a vertical displacement mechanism with parts thereof broken away to show otherwise hidden structure.

DETAILED DESCRIPTION OF THE PREFERRED EMBODIMENT(S)

Figure 6A:
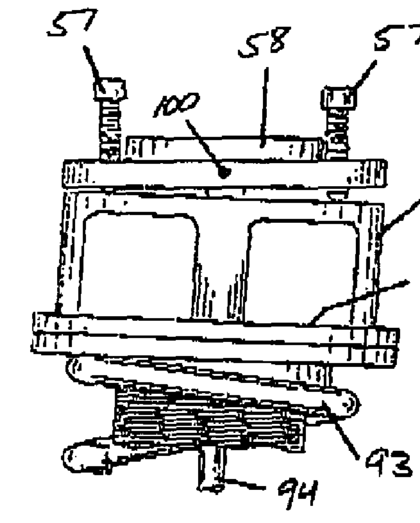
FIG. 6 is an anterior view of the strut spring-compression apparatus otherwise shown in FIG. 1 with a fragmentary strut assembly being channel-received and held in a substantially vertical spatial orientation by the spring-engagement assembly of the apparatus.
Figure 6:
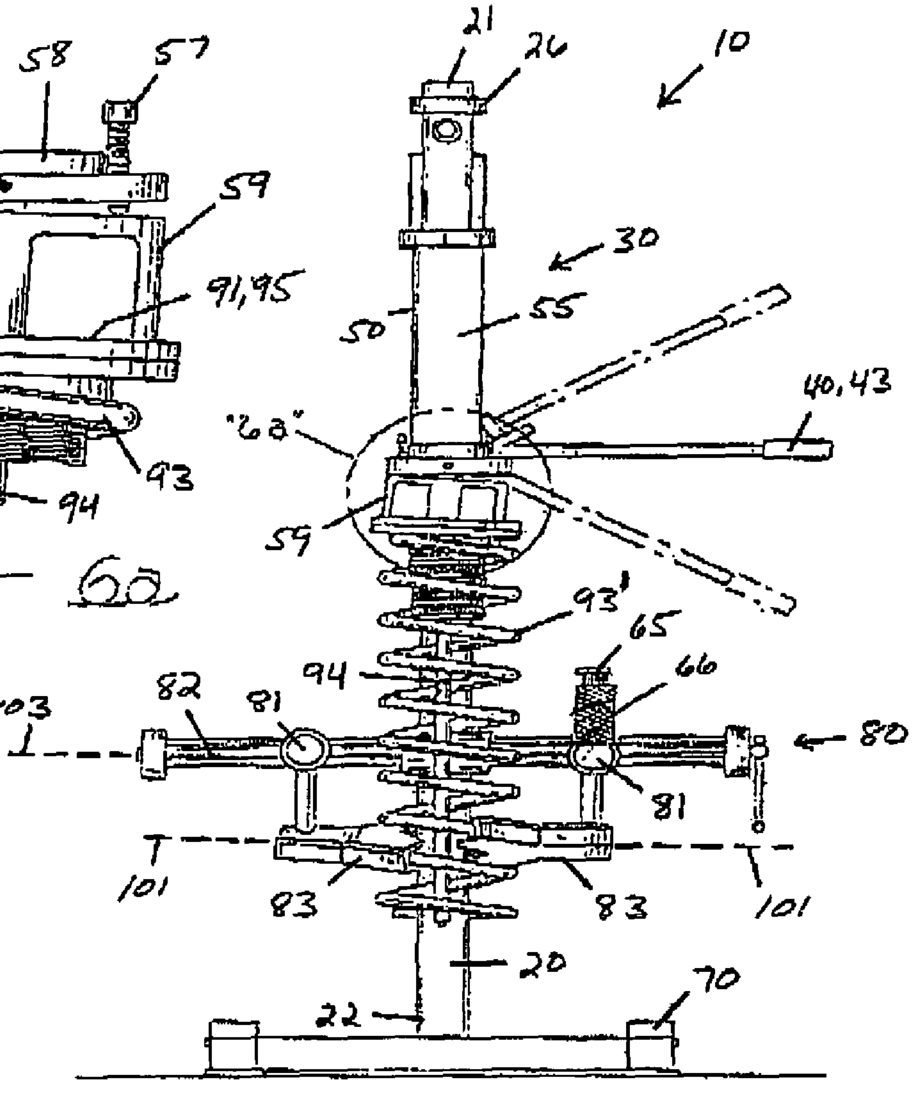

Referring now to the drawings, the preferred embodiment of the present invention generally concerns a strut spring-compression apparatus 10 or a strut spring compressor for facilitating maintenance of a McPherson-type strut assembly. The spring-compression apparatus 10 of the preferred embodiment is generally illustrated and referenced in FIGS. 1, 3, and 6. A generic McPherson-type strut assembly 90 is generally illustrated and referenced in FIGS. 2 and 3. A fragmentary, modified strut assembly 9 having an exaggerated helix-type or coil spring 93' is generally depicted in FIG. 6. The exaggerated coil spring 93' is illustrated, in part, to help depict how certain structure of the present spring-compression apparatus 10 engages the helix or coil spring 93 of a strut assembly 90.

Figure 2:
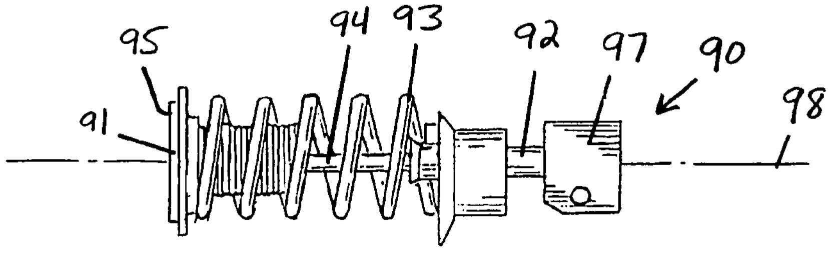
FIG. 2 is a side view of a generic strut assembly in a substantially horizontal spatial orientation.
Figure 3:
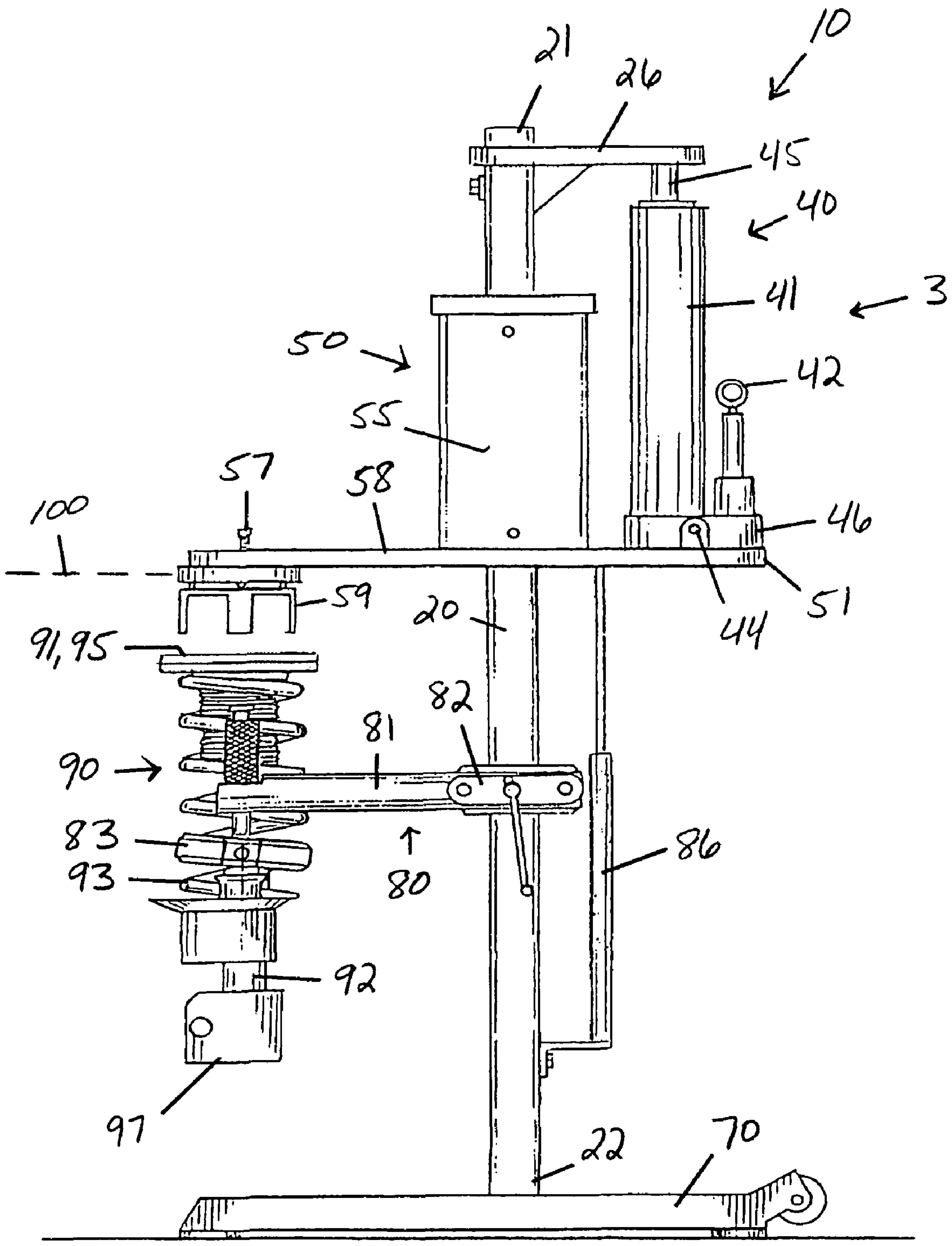
FIG. 3 is a side view of the strut spring-compression apparatus otherwise shown in FIG. 1 with the generic strut assembly otherwise shown in FIG. 2 being channel-received and held in a substantially vertical spatial orientation by a the jaw or channel assembly.

It will be understood from a general inspection of the noted figures, as well as from a general consideration of a generic McPherson-type strut assembly, that the strut assembly 90 essentially comprises a first strut end 91 as referenced in FIGS. 2, 3, 6, and 6(*a*); a strut body 92 as generally referenced in FIG. 2; a helix type or coil-type strut spring 93 as illustrated and referenced in FIGS. 2, 3, 5, 6, and 6(*a*); a piston rod 94 as illustrated and referenced in FIGS. 2, 6, and 6(*a*); a spring seat 95 as generally illustrated and referenced in FIGS. 2, 3, 6, and 6(*a*); a second strut end 97 as generally referenced in FIGS. 2 and 3; and a longitudinal strut axis 98 as generally referenced in FIG. 2.

The first strut end 91 typically comprises a mounting nut (not specifically illustrated in the accompanying drawings) for retaining the strut spring 93 (a compression coil) in a partially compressed state. In this last regard, the reader is directed to the specification of U.S. Pat. No. 7,103,951 ('951 Patent), which is reflective of the current specification, and composed by the same author, for a more detailed discussion of mounting nut(s) and associated structures. Indeed, certain explanatory specification portions of the '951 Patent may be considered incorporated by reference thereto insofar as the specification may be said to support structures of the strut assembly 90 and subject matter common to both the '951 Patent and the teachings of the present specification.

It may thus be noted that the piston rod 94 preferably comprises a threaded rod end for receiving the mounting nut, and that the strut axis 98 extends through the strut body 92 and piston rod 94. The mounting nut is preferably threadably received on the rod end for maintaining the strut assembly 90 in an assembled, spring-compressed state. As earlier stated the strut spring 93 is a compression coil and is under a considerable amount of compression when strut assembly 90 is in an assembled, spring-compressed state. Thus, there is a significant force being directed against spring seat 95 and the mounting nut when strut assembly 90 is in an assembled, spring-compressed state.

In order to properly and safely remove the mounting nut, the strut spring 93 must first be further compressed so as to remove or otherwise redirect the forces from the compressed strut spring 93 away from the mounting nut so that the mounting nut may be safely removed from the rod end. In this regard, it is contemplated that redirection of the spring-compressed forces is achieved by the introduction of some other structure that further compresses strut spring 93. Thus, it is believed that spring-compression apparatus 10 of both the '951 Patent and the current specification provide excellent means for properly and safely removing mounting nuts from McPherson-type strut assemblies.

Figure 1:
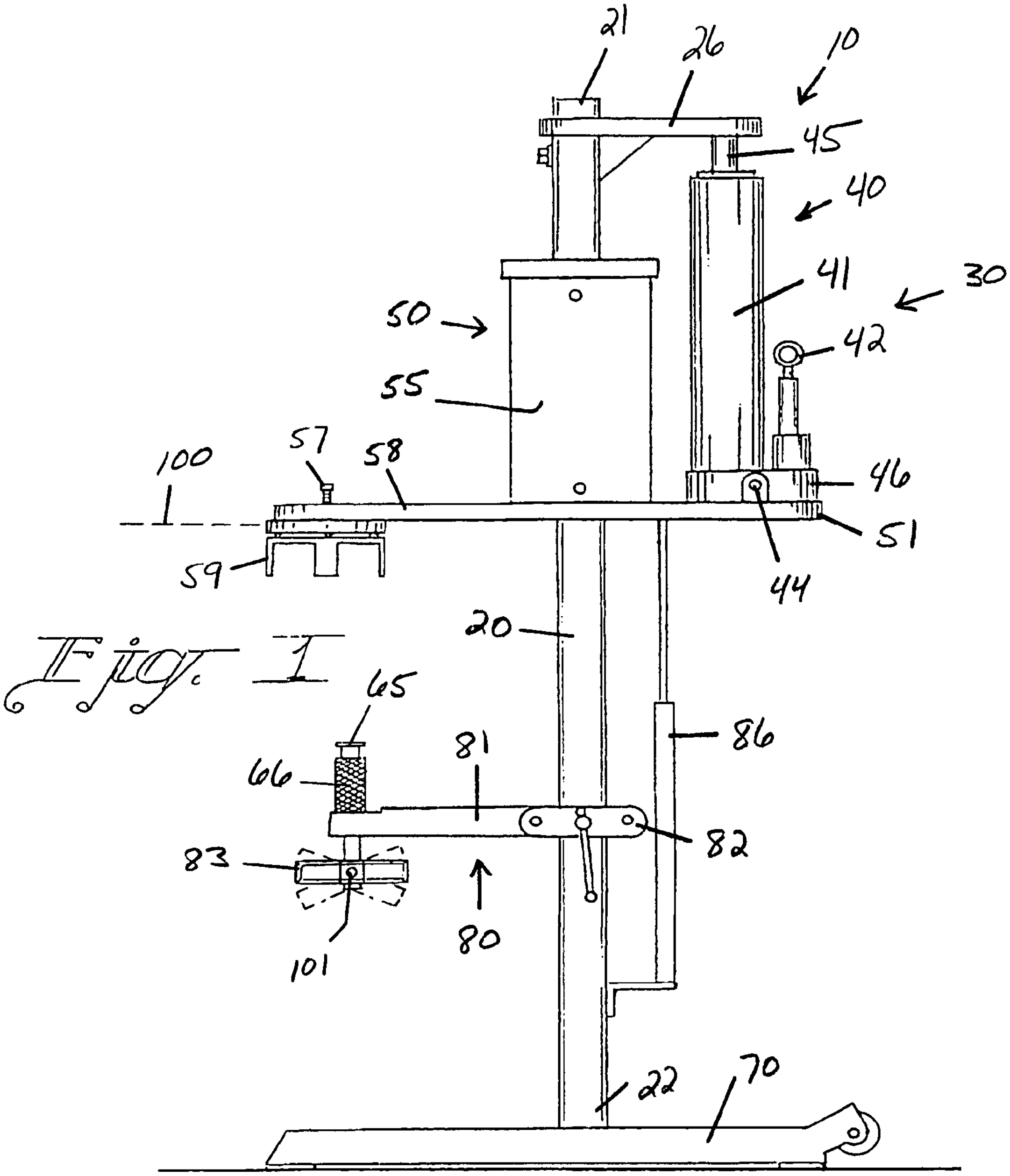
FIG. 1 is a side view of the strut spring-compression apparatus according to the present invention depicting a pivotable jaw or channel assembly in broken lines.

The spring-compression apparatus 10 according to the present invention preferably comprises an upright or guide member 20 as generally illustrated and referenced in FIGS. 1, 3-6, and 7; a carriage assembly 30 as generally illustrated and referenced in FIGS. 1, 3, 4, and 6; a base or rest assembly 70 as generally illustrated and referenced in FIGS. 1, 3, and 6; and certain helix-grabbing means or spring-engagement assembly 80 as generally illustrated and referenced in FIGS. 1, 3, 5, 6, and 7.

It will be seen from an inspection of the applicable figures that guide member 20 preferably comprises a first member end 21, a second member end 22, and a member length extending intermediate first and second member ends 21 and 22. It will be further seen that first member end 21 preferably comprises a jack stop 26 as illustrated and referenced in FIGS. 1, 3, and 6. In other words, jack stop 26 may be cooperatively associated with the guide member 20 adjacent the first member end 21 substantially as illustrated in the noted figures. It will be seen that jack stop 26 generally extends outwardly from the longitudinal axis of the guide member 20 such that the plane in which the jack stop 26 lies is preferably orthogonal to the longitudinal axis of the guide member 20.

Carriage assembly 30 preferably comprises certain carriage displacement means or spring compression means for forcefully displacing the carriage assembly 30 and/or apparatus-compressing a strut spring 93; and certain member engagement means for guiding displacement of the carriage assembly 30 relative to the guide member 20. It is contemplated that the carriage displacement means or spring compression means may be preferably defined by a jack assembly 40 and that the member engagement means may be preferably defined by a slide assembly 50 as both generally illustrated and referenced in FIGS. 1, 3, 4, and 6.

Jack assembly 40 preferably comprises a ram jack or jack 41 as referenced in FIGS. 1 and 3; jack extension means, and jack release means. It is contemplated that the jack extension means may be defined by a pump assembly 42 otherwise cooperatively associated with jack 41 and which may be operated (via a pump handle) as generally depicted in FIG. 6 at reference numeral 43 to extend jack 41. It is further contemplated that the jack release means may be defined by a release valve 44 or similar other release means typical to common hydraulic or similar other fluid-operated jacks. Release valve 44 has been referenced for the reader's benefit in FIGS. 1, 3, and 4. It will be understood that jack 41 preferably comprises a stop-engaging end 45 and a pedestal-engaging end 46 both as further illustrated in FIGS. 1 and 3.

Slide assembly 50 preferably comprises a jack pedestal as illustrated and referenced in FIGS. 1, 3, and 9; and a carriage 55 as illustrated and referenced in FIGS. 1, 3, 4, and 6. Carriage 55 preferably comprises a pedestal-engaging end; and a member-receiving tunnel (not specifically illustrated). The guide member 20 is preferably slidably received in the member-receiving tunnel. In this regard, it will be understood that the member-receiving tunnel is sized and shaped so as to more properly (and slidably) receive the guide member 20.

Figure 4:
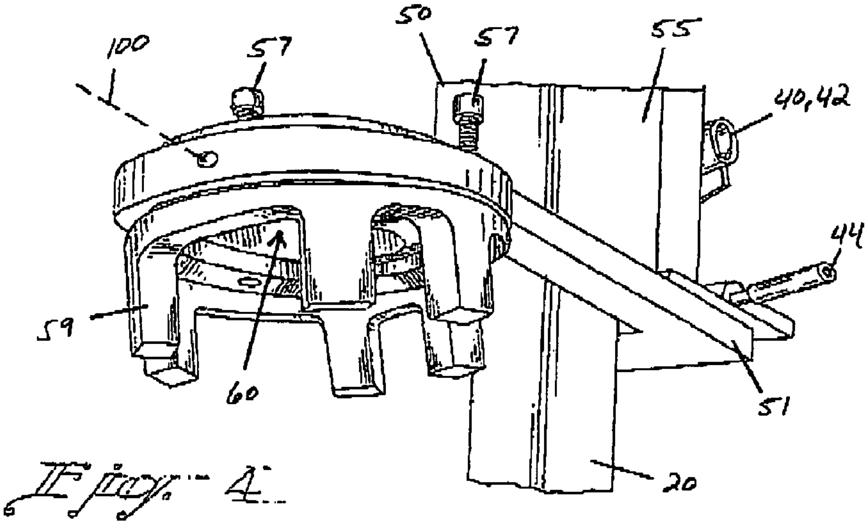
FIG. 4 is a bottom perspective type depiction of a strut interfacing crown assembly as attached to a fragmentary carriage assembly, which carriage assembly is slidably received on an upright, fragmentary guide member.
Figure 5:
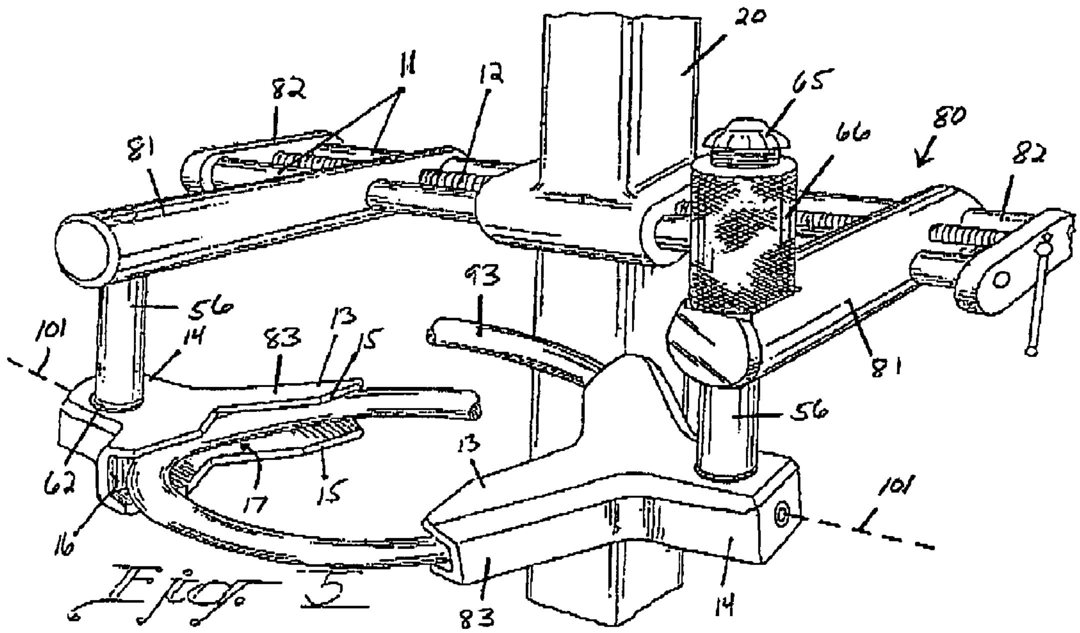
FIG. 5 is a top perspective type depiction of the spring-engagement assembly as attached to a fragmentary guide member and depicting a fragmentary coil as channel-received by laterally-displaceable jaw assemblies of the spring-engagement assembly.

It will be seen from an inspection of the noted figures that the jack pedestal 51 may be said to comprise a locator extension arm 58 as illustrated and referenced in FIGS. 1, 3, and 4; and a pivotable crown-like center locator 59 for structurally interfacing intermediate the arm 58 and the spring seat 95 as illustrated and referenced in FIGS. 1, 3, 4, 6, and 6(*a*). The strut end interface or center locator 59 is pivotally attached to the locator extension arm as depicted by pivot axis 100 in FIGS. 1, 3, 4, 6, and 6(*a*). Screw members or threaded members 57 may enable the pivot action about axis 100. The pivotally attached strut end interface enables enhanced interfacing engagement intermediate the first strut end 91 and the locator extension arm 58. The locator extension arm 58 and the crown-like center locator 59 further comprises nut accessing means for enabling manual or tool-enabled access to the mounting nut, which nut accessing means may preferably be defined by a relatively large nut access aperture formed 60 through the locator extension arm 58 and center locator 59 as generally depicted in FIG. 4.

The spring-engagement assembly 80 according to the present invention is central to the practice of the present invention, and is believed to eliminate many of the shortcomings inherently otherwise taught by the '951 patent. The spring-engagement assembly 80 preferably may be said to essentially define certain helix-grabbing means according to the present invention. The helix-grabbing means may thus be said to comprise first and second laterally disposed shaft-mounted extension arms 81; certain arm displacement means for laterally displacing the extension arms; and first and second helix-engaging or coil-engaging channel structures 83 attached to first ends of the extension arms 81 via vertical extensions 56 as illustrated and referenced in FIGS. 1, 3, 5, 6, 7, and 7(*a*). Second ends of the extension arms 81 are screw-attached or screw-mounted to the screw mechanism 82, and the screw mechanism 82 is cooperably associated with the guide member 20 such that the screw axis as fixed relative to the axis of the guide member 20. It is contemplated that the arm displacement means may be preferably defined by a screw mechanism 82 cooperably associated with the extension arms 81 being disposed, in part, therebetween.

The screw mechanism 82 thus functions to laterally displace the first and second helix-engaging channels 83 into and out of engagement with the strut spring 93. In other words, the helix-engaging channels or channel structures 83 receive laterally opposed portions of the strut spring 93 when displaced into engagement therewith as generally depicted in FIG. 6. The channel-engaging structures 83 each preferably comprise certain channel-like structure such that when laterally opposed arc lengths of the helix or coil of strut spring 93 are received, the axis of the coil centrally located to the channel junctions is relatively fixed in space.

The helix-channeling means or helix-engaging channel structures 83 are preferably pivotally attached to vertical extensions 56 of the extension arms 58 as depicted by pivot axes 101 in FIGS. 1, 5, 6, 7, and 7(*a*). In this regard, it is contemplated that the structures 83 may pivot about 15 degrees as dictated by the size of the bore 62 of structure(s) 83, which bore functions to receive vertical extensions 56 and limit pivotable rotation about axes 101. It is contemplated that the helix-channeling means may well function to channel laterally opposed spring helix portions and thereby fix the axis of the strut spring. In other words, the pivotally attached helix-engaging channel structures 83 may be said to enable a user to engage a variably pitched strut spring 93 or variously pitched strut springs 93. Stated another way, the pivotally attached helix-engaging channel structures 83 may well function to enable a user to engage strut springs having varied chirality or coil handedness.

Figure 7:
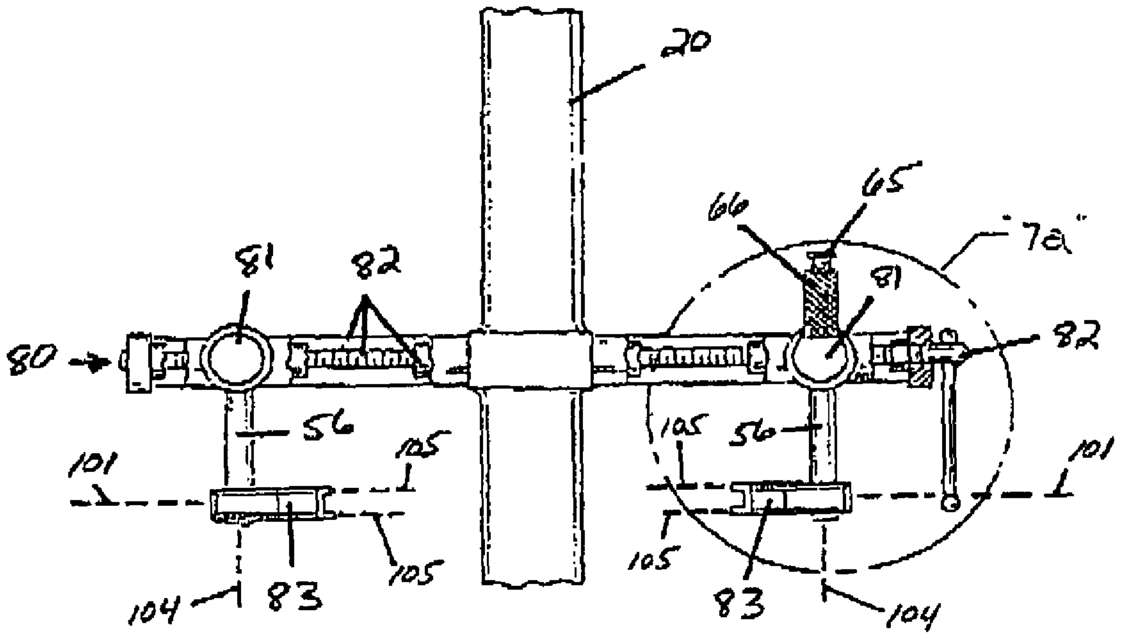
FIG. 7 is a fragmentary anterior type depiction of the spring-engagement assembly with parts broken away to show otherwise hidden structure.
Figure 7A:
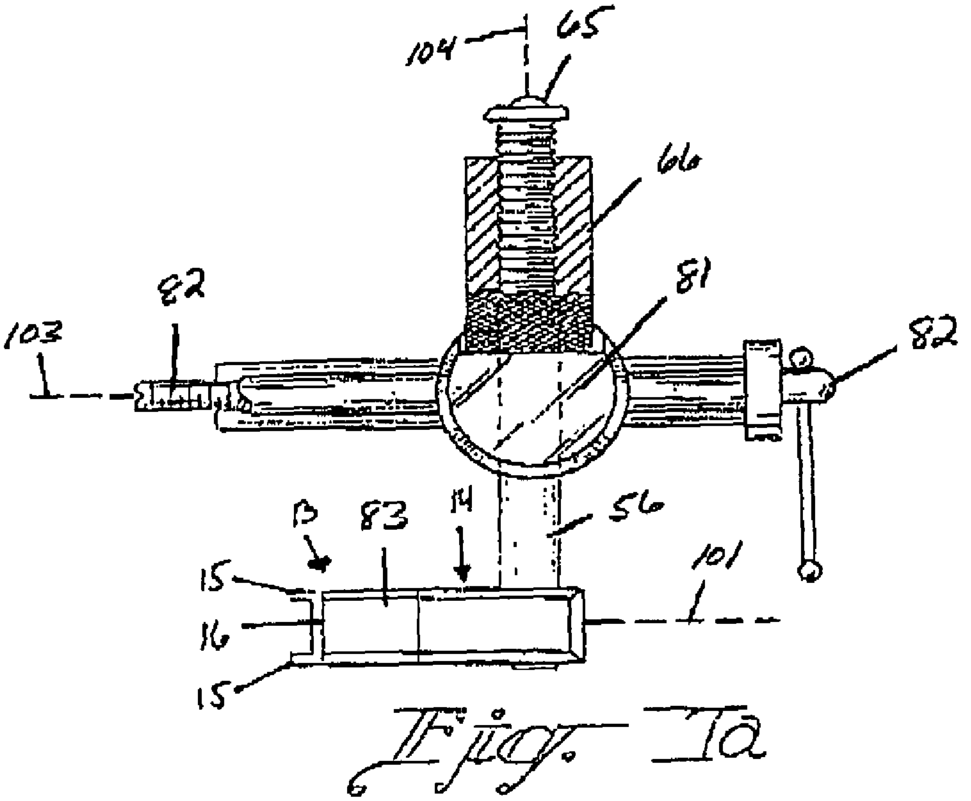

From a general inspection of the noted figures, as well as from more particular consideration of FIG. 7(*a*), it may be seen that the a select helix-engaging channel structure 83 may comprises certain vertical or axial displacement means for enabling a user to vertically (or axially) displace the pivotally attached helix-engaging channel structure 83 relative to the strut spring 93 as a means, for example, to engage variably torsioned strut springs 93. In other words, it may be seen from an inspection of FIG. 7(*a*) that the vertical displacement means may be defined by a threaded vertical extension 56 as at 65 along with a threaded collar as at 66, which together function to vertically displace the associated structure 83 as may be required to axially engage the coil of springs 93.

The strut spring 93 or coil of the strut assembly 90 is thus graspable by the structures 83 for fixing a first end or portion of the strut axis. The jack extension means as previously specified are thus operable to extend jack 41 and displace the crown-like end interfacing device or center locator 59 toward the structures 83 as may be understood from a comparative inspection of FIGS. 3 and 6. The pivotable center locator 59 is thus engageable with the strut end 91 or spring seat 95 for fixing a second end or portion of the strut axis and serving as an interface when compressing or "apparatus-compressing" the strut spring 93. The nut accessing means enable a user to remove the mounting nut from the rod end after the strut spring 93 is sufficiently apparatus-compressed.

It should be noted that the nut accessing means or nut access aperture 60 is sufficiently sized and shaped so as to allow tool or socket structure to be inserted through the nut accessing means and cooperatively engage the mounting nut for removal thereof. Typically, the removal of a mounting nut is achieved via either a pneumatically driven socket-outfitted tool or similar other socket-outfitted tool designed for nut removal. The jack release means as previously specified are further operable to retract the jack 41 and thus fully decompress the strut spring 93 to a relaxed state. Thus, it will be seen that the described spring-compression apparatus 10 enables effective disassembly of a strut assembly such as assembly 90 thereby facilitating maintenance or repair of the target strut assembly.

It is further contemplated that spring-compression apparatus 10 may further preferably comprise certain carriage return means for displacing the carriage assembly 30 toward the first member end 21. In this regard, it is contemplated that the carriage return means may be defined by a compression type gas spring assembly 86 as generally depicted and referenced in FIGS. 1 and 3. It may be seen from an inspection of the noted figures that the spring assembly 86 extends intermediate an inferior portion of the guide member 20 and the jack pedestal 51. The spring assembly 86 when compressed via action of the jack assembly 40 provides a restorative force that returns or displaces the carriage assembly 30 toward the first member end 21 when the jack release means enable free movement of the carriage assembly 30 relative to the guide member 20.

While the above description contains much specificity, this specificity should not be construed as limitations on the scope of the invention, but rather as an exemplification of the invention. For example, it is believed that the spirit of the present invention discloses a spring compression apparatus for facilitating maintenance of a strut assembly, which apparatus may be said to essentially comprise a guide member, a carriage assembly, and a spring-engagement assembly or certain helix- or coil-grabbing means.

The guide member comprises a first member end, a second member end, and a member length extending intermediate the first member end and the second member end. The carriage assembly comprises a jack assembly and a slide assembly. The jack assembly comprises a jack, jack extension means, and jack release means. The jack comprises a stop-engaging end and a pedestal-engaging end. The slide assembly comprises a jack pedestal, a pivotable center locator or strut end interface and a carriage. The carriage comprises an arm-engaging end, a pedestal-engaging end, and a member-receiving tunnel. The guide member is slidably received in the member-receiving tunnel. The center locator is attached to a locator extension arm, which may be an extension of the jack pedestal.

The spring-engagement assembly comprises first and second laterally disposed shaft-mounted extension arms, a screw mechanism disposed between the extension arms, and first and second helix-engaging channel structures attached to first ends of the extension arms. Second ends of the extension arms are screw-attached to the screw mechanism and the screw mechanism is cooperably associated with the guide member for enabling lateral displacement(s) of the extension arms. In other words, the screw mechanism functions to laterally displace the first and second helix-engaging channels into and out of engagement with the strut spring of strut assembly. The helix-engaging channels receive laterally opposed portions of the strut spring when displaced into engagement therewith.

The pivotable strut end interface or center locator is attached to the locator extension arm for interfacing intermediate the first strut end and the locator extension arm. The jack extension means are operable to extend the jack and displace the locator assembly toward the spring-engagement assembly. The strut end interface is engageable with the first strut end for apparatus-compressing the strut spring. The jack release means are operable to retract the jack and fully decompress the strut spring. The spring-compression apparatus thereby enables strut assembly disassembly, and facilitates maintenance of the strut assembly.

Stated another way, the apparatus according to the present invention may be said to essentially comprise a guide member, a carriage assembly, and certain helix grabbing means. The guide member functions to guide the displaceably received carriage assembly, which carriage assembly comprises certain carriage displacement means, certain member engagement means, and a (pivotable) strut end interface (having certain nut accessing means). The guide member is cooperatively associated with the member engagement means for guiding carriage assembly displacement and the carriage displacement means enable carriage assembly displacement. The strut end interface engages a first strut end of a strut assembly. The coil or helix-grabbing means function to laterally grab a strut spring helix or spring coil and fix the axis thereof. The carriage displacement means are operable to displace the strut end interface toward the strut spring helix, which end-engaged strut end interface may well function to apparatus-compress the strut spring helix during carriage displacement.

It is contemplated that the central feature(s) of the present invention are the heretofore described helix-grabbing means. Notably, the helix-grabbing means may be said to preferably comprise or be defined by (1) laterally displaceable arm assemblies, (2) a screw driven arm-displacement or arm-displacing assembly, and (3) opposed, Y-shaped helix-engaging, channel structures.

The arm displacement assembly or screw mechanism 82 according to the present invention may be said to preferably comprise opposed arm guide members as at 11, and a screw member as at 12. It will be seen from an inspection of the figures that the arm-guide members 11 and screw member 12 are substantially parallel to one another and thus extend in a first plane as generally referenced at 103.

The arm assemblies comprise first and second arm portions, which may be defined by arm extensions 81 and vertical extensions 56, respectively. The first arm portions (or arm extensions 81) extend substantially parallel relative to one another orthogonal to the arm-guide and screw members 11 and 12 substantially coplanar therewith in the first plane 103. The second arm portions (or vertical extensions 56) extend substantially parallel to one another axially orthogonal to the first arm portions as at 81 but substantially coplanar therewith in parallel second plane(s) as generally referenced at 104.

The Y-shaped, helix-engaging, channel structures as at 83 each comprise an axial stem portion as at 13 and a V-shaped channel structure as at 14. The pivot axes (as at 101) of the stem portions 14 are substantially parallel to the first plane 103. The V-shaped channel structures 13 each comprise opposed, paired flanges as at 15 and an angled channel bottom portion as at 16. The opposed paired flanges 15 respectively extend in parallel channel planes as at 105. The paired flanges 15 and channel bottom 16 together define a U-shaped transverse channel cross-section in a first dimension and an arc-length-receiving pocket 17 in a second dimension orthogonal to the first dimension.

The stern portions 14 are attached to the second arm portions 56 substantially and axially orthogonal thereto (i.e. axes 101 are preferably at right angles to planes 104). The arm displacement assembly is thus cooperable with the arm assemblies for simultaneously displacing the arm assemblies equidistances to and from a common first axis (i.e. the axis of the strut spring 93) for simultaneously and laterally displacing the arc-length-receiving pockets 17 into and out of engagement with laterally opposed arc lengths of the helical strut spring 93 intermediate the length thereof and intermediate said paired flanges 15 when displaced into engagement therewith.

The paired flanges 15 thus prevent movement of the strut spring 93 in directions parallel the common first axis (i.e. prevent movement of the strut spring in upward and/or downward directions); and the arm assemblies, arm displacement assembly, stem portions 14, and bottom portions 16 together prevent movement of the strut spring 93 in directions parallel the first plane (i.e. prevent movement of the strut spring in directions orthogonal to upward and/or downward directions).

Accordingly, although the invention has been described by reference to certain preferred embodiments, it is not intended that the novel assembly or apparatus be limited thereby, but that modifications thereof are intended to be included as falling within the broad scope and spirit of the foregoing disclosure, the following claims and the appended drawings.

I claim:

1. An apparatus for facilitating maintenance of a strut assembly, the apparatus comprising:

a guide member, the guide member comprising a first member end, a second member end, and a member length extending intermediate the first member end and the second member end;

a carriage assembly, the carriage assembly comprising carriage displacement means for enabling axial carriage assembly displacement relative to the guide member and member engagement means for guiding carriage assembly displacement relative to the guide member;

a spring-engagement assembly, the spring-engagement assembly comprising laterally displaceable arm assemblies, a screw-driven arm displacement assembly, and Y-shaped, helix-engaging, channel structures, the screw-driven arm displacement assembly comprising two arm-guide members and a screw member, the arm-guide and screw members being parallel to one another and extending in a first plane, the arm assemblies each comprising first arm portions and second arm portions, the first arm portions extending substantially parallel relative to one another axially orthogonal to the arm-guide and screw members substantially coplanar therewith in the first plane, the second arm portions extending substantially parallel to one another axially orthogonal to the first arm portions substantially coplanar therewith in a second plane, the Y-shaped, helix-engaging, channel structures each comprising an axial stem portion and a V-shaped channel structure, the axes of the stem portions being parallel to the first plane, the V-shaped channel structures each comprising opposed, paired flanges and an angled channel bottom portion, the opposed paired flanges extending in parallel channel planes, the paired flanges and channel bottom defining an U-shaped transverse channel cross-section in a first dimension and an arc-length-receiving pocket in a second dimension orthogonal to the first dimension, the stem portions being attached to the second arm portions substantially orthogonal thereto, the screw-driven arm displacement assembly being cooperable with the arm assemblies for (1) simultaneously displacing the arm assemblies equidistances to and from a common first axis for (a) simultaneously and laterally displacing the arc-length-receiving pockets into and out of engagement with laterally opposed arc lengths of a helical strut spring of a strut assembly intermediate the length thereof and intermediate said paired flanges when displaced into engagement therewith, said paired flanges for preventing movement of the strut spring in directions parallel the common first axis, said arm assemblies, said arm displacement assembly, said stem portions, and said bottom portions for preventing movement of the strut spring in directions parallel the first plane; and a strut end interface, the strut end interface being attached to the carriage assembly and engageable with a first strut end of a strut assembly, the carriage displacement means being operable to compressibly displace the strut end interface toward the Y-shaped, helix-engaging, channel structures for apparatus-compressing the strut spring, the strut spring being compressible intermediate the paired flanges and the strut end interface.

2. The apparatus of claim 1 wherein the strut end interface is pivotally attached to the carriage assembly, the pivotally attached strut end interface being pivotable about a first pivot axis, the first pivot axis being parallel to the first and second planes for enabling enhanced interfacing engagement intermediate the first strut end and the carriage assembly.

3. The apparatus of claim 2 wherein the strut end interface comprises nut access means for enabling a user to remove a mounting nut from the strut assembly when the strut spring is apparatus-compressed.

4. The apparatus of claim 1 wherein the stem portions are pivotally attached to the second arm portions such that the stem portions are pivotable about second pivot axes, the second pivot axes being parallel to the first plane, the pivotally attached Y-shaped, helix-engaging, channel structures for enabling a user to engage a variably pitched strut spring.

5. The apparatus of claim 4 wherein a select second arm portion comprises vertical displacement means for enabling a user to vertically displace the respective pivotally attached Y-shaped, helix-engaging, channel structure to engage variably torsioned strut springs.

6. The apparatus of claim 1 wherein the stem portions are pivotally attached to the second arm portions such that the stem portions are pivotable about pivot axes, the pivot axes being parallel to the first plane, the pivotally attached Y-shaped, helix-engaging, channel structures for enabling a user to engage strut springs having varied chirality.

7. An apparatus for facilitating maintenance of a strut assembly, the apparatus comprising:

a guide member, the guide member comprising a first member end, a second member end, and a member length extending intermediate the first member end and the second member end;

a carriage assembly, the carriage assembly comprising carriage displacement means for enabling carriage assembly displacement, member engagement means for guiding carriage assembly displacement, and a strut end interface, the strut end interface for engaging a first strut end of a strut assembly; and helix-grabbing means for simultaneously grabbing laterally opposed portions of a strut spring helix, the helix-grabbing means comprising laterally displaceable arm assemblies, an atm displacement assembly, and Y-shaped helix-engaging, channel structures, the arm displacement assembly comprising an arm guide member and a screw member, the arm-guide and screw members being parallel to one another and extending in a first plane, the arm assemblies each comprising first and second arm portions, the first arm portions extending substantially parallel relative to one another axially orthogonal to the arm-guide and screw members substantially coplanar therewith in the first plane, the second arm portions extending substantially parallel to one another axially orthogonal to the first arm portions substantially coplanar therewith in a second plane, the Y-shaped, helix-engaging, channel structures each comprising an axial stem portion and a V-shaped channel structure, the axes of the stem portions being parallel to the first plane, the V-shaped, channel structures each comprising opposed, paired flanges and an angled channel bottom portion, the opposed paired flanges extending in parallel channel planes, the paired flanges and channel bottom defining a U-shaped transverse channel cross-section in a first dimension and an arc-length-receiving pocket in a second dimension orthogonal to the first dimension, the stem portions being attached to the second arm portions substantially orthogonal thereto, the arm displacement assembly being cooperable with the arm assemblies for simultaneously displacing the arm assemblies equidistances to and from a common first axis for simultaneously and laterally displacing the arc-length-receiving pockets into and out of engagement with laterally opposed arc lengths of a helical strut spring of a strut assembly intermediate the length, thereof and intermediate said paired flanges when displaced into engagement therewith, said channel flange for preventing movement of the strut spring in directions parallel the common first axis, said arm assemblies, said arm displacement assembly, said stem portions, and said bottom portions for, preventing movement of the strut spring in directions parallel the first plane; the carriage displacement means being operable to compressibly displace the strut end interface toward the paired flanges, the strut end interface thus for apparatus-compressing the strut spring helix during carriage displacement, the strut spring helix being compressible intermediate the paired flanges and the strut end interface.

8. The apparatus of claim 7 wherein the strut end interface is pivotally attached to the carriage assembly, the pivotally attached strut end interface being pivotable about a first pivot axis, the first pivot axis being parallel to the first and second planes for enabling enhanced interfacing engagement intermediate the first strut end and the carriage assembly.

9. The apparatus of claim 7 wherein the strut end interface comprises nut access means for enabling a user to remove a mounting nut from the strut assembly when the strut spring is apparatus-compressed.

10. The apparatus of claim 7 wherein the stem portions are pivotally attached to the second arm portions such that the stem portions are pivotable about second pivot axes, the second pivot axes being parallel to the first plane, the helix-grabbing means thus for enabling a user to engage a variably pitched strut spring.

11. The apparatus of claim 7 wherein the stem portions are pivotally attached to the second arm portions such that the stem portions are pivotable about pivot axes, the pivot axes being parallel to the first plane, the helix-grabbing means thus for enabling a user to engage strut springs having varied chirality.

12. The apparatus of claim 7 wherein a select second arm portion comprises vertical displacement means for enabling a user to vertically displace the respective pivotally attached Y-shaped, helix-engaging, channel structure relative to a strut spring.

13. An apparatus for facilitating maintenance of a strut assembly, the apparatus comprising:

a carriage assembly and helix-channeling means, the carriage assembly comprising carriage displacement means for enabling carriage assembly displacement, carriage-guiding means for guiding carriage assembly displacement, and a strut end interface, the strut end interface for engaging a first strut end of a strut assembly, the helix-channeling means for receiving a strut spring helix at laterally opposed portions thereof, the helix-channeling means comprising laterally displaceable arm assemblies, an arm displacement assembly, and Y-shaped helix-engaging, channel structures, the arm displacement assembly extending in a first plane, the arm assemblies extending in a second plane orthogonal to the first plane, the Y-shaped, helix-engaging, channel structures each comprising an axial stem portion and a V-shaped channel structure, the axes of the stem portions being parallel to the first plane, the V-shaped channel structures each comprising opposed, paired flanges and an angled channel bottom portion, the opposed paired flanges extending in parallel, channel planes, the paired flanges and channel bottom defining a U-shaped transverse channel cross-section in a first dimension and an arc-length-receiving pocket in a second dimension orthogonal to the first dimension, the stem portions being attached to the arm assemblies substantially orthogonal thereto, the arm displacement assembly being cooperable with the arm assemblies for simultaneously displacing the arm assemblies equidistances to and from a common first axis for simultaneously and laterally displacing the arc-length-receiving pockets into and out of engagement with laterally opposed arc lengths of a helical strut spring of a strut assembly intermediate the length thereof and intermediate said channel flanges when displaced into engagement therewith, said paired flanges for preventing movement of the strut spring in directions parallel the common first axis, said arm assemblies, said arm displacement assembly, said stem portions, and said bottom portions for preventing movement of the strut spring in directions parallel the first plane, the carriage displacement means being operable to displace the strut end interface toward the paired flanges, the strut end interface for apparatus-compressing the strut spring helix during carriage displacement, the strut spring helix being compressible intermediate the paired flanges and the strut end interface.

14. The apparatus of claim 13 wherein the strut end interface is pivotally attached to the carriage assembly, the pivotally attached strut end interface being pivotable about a first pivot axis, the first pivot axis being parallel to the first and second planes for enabling enhanced interfacing engagement intermediate the first strut end and the carriage assembly.

15. The apparatus of claim 13 wherein the strut end interface comprises nut access means for enabling a user to remove a mounting nut from the strut assembly when the strut spring is apparatus-compressed.

16. The apparatus of claim 13 wherein the stem portions are pivotally attached to the second arm portions such that the stem portions are pivotable about pivot axes, the pivot axes being parallel to the first plane, the helix-channeling means thus for enabling a user, to engage a variably pitched strut spring.

17. The apparatus of claim 13 wherein the stem portions are pivotally attached to the second arm portions such that the stem portions are pivotable about second pivot axes, the second pivot axes being parallel to the first plane, the helix-channeling means thus for enabling a user to engage strut springs having varied chirality.

18. The apparatus of claim 13 wherein a select arm assembly comprises vertical displacement means for enabling a user to vertically displace the respective pivotally attached Y-shaped, helix-engaging, channel structure relative to a strut spring.

* * * * *